(12) United States Patent
Blahak et al.

(10) Patent No.: US 6,664,671 B2
(45) Date of Patent: Dec. 16, 2003

(54) ROTATING ELECTRICAL MACHINE

(75) Inventors: Axel Blahak, Bietigheim-Bissingen (DE); Uwe Knappenberger, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 3 days.

(21) Appl. No.: 10/018,185

(22) PCT Filed: Apr. 11, 2001

(86) PCT No.: PCT/DE01/01423
§ 371 (c)(1),
(2), (4) Date: Mar. 15, 2002

(87) PCT Pub. No.: WO01/80403
PCT Pub. Date: Oct. 25, 2001

(65) Prior Publication Data
US 2002/0113516 A1 Aug. 22, 2002

(30) Foreign Application Priority Data

Apr. 14, 2000 (DE) .......................... 101 18 468
Mar. 21, 2001 (DE) .......................... 101 13 673

(51) Int. Cl.⁷ ................................................ H02K 9/00
(52) U.S. Cl. ............................ 310/52; 310/44; 310/56; 310/227
(58) Field of Search .......................... 310/52, 44, 251, 310/252, 253, 245, 233, 227, 58, 57, 54, 56, 60 R

(56) References Cited

U.S. PATENT DOCUMENTS 4,818,906 A * 4/1989 Kitamura et al. ............. 310/58
6,087,746 A * 7/2000 Couvert et al. ........... 310/60 R

FOREIGN PATENT DOCUMENTS

EP 0949343 A1 * 10/1999 ............. C22C/9/06
FR 559 354 A 9/1923

OTHER PUBLICATIONS

Patent Abstracts of Japan vol. 1998, No. 02, Jan. 30, 1998 & JP 09 263864 A, Oct. 7, 1997.

* cited by examiner

Primary Examiner—Thanh Lam
(74) Attorney, Agent, or Firm—Michael J. Striker

(57) ABSTRACT

The invention relates to a rotating electrical machine with a contacting device whose circumference has at least one slide contact disposed on it, which remains in sliding contact with a brush apparatus (slide system), in which the at least one slide contact is comprises of a wear resistant material. The invention provides that the electrical machine has an internal cooling system in which a fluid/gas mixture used as a cooling medium circulates around the components to be cooled, including the slide system, and the at least one slide contact is comprises of an alloy with at least one alloy component that has an affinity for oxygen.

7 Claims, 1 Drawing Sheet

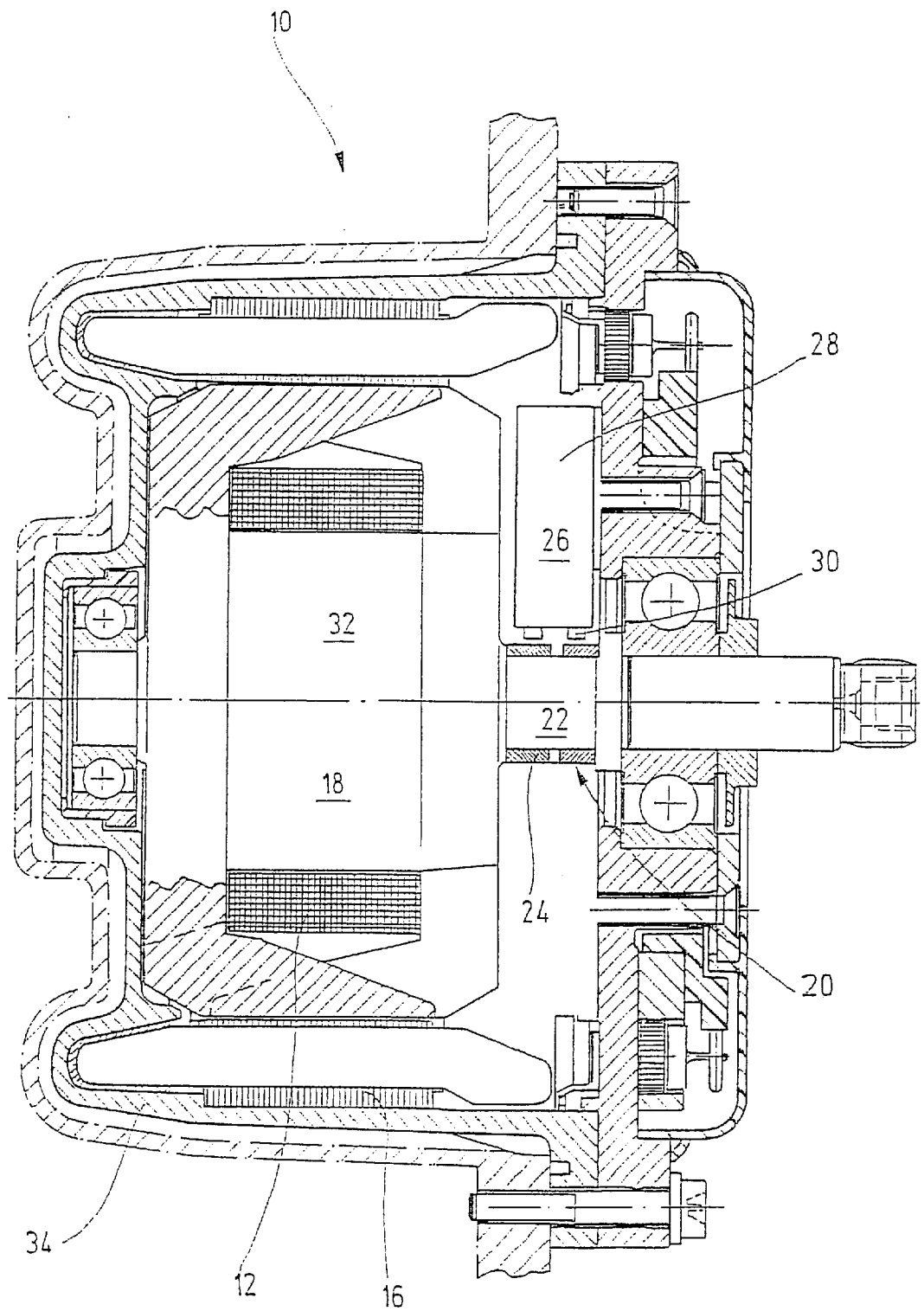

ROTATING ELECTRICAL MACHINE

The invention relates to a rotating electrical machine with an internal cooling system according to the features disclosed in the preamble to claim 1.

PRIOR ART

In rotating electrical machines, it is known to use contacting devices in order to electrically contact coils disposed in a rotating armature. These contacting devices have slide contacts which remain in sliding contact with a brush apparatus. The brushes, which are as a rule produced based on graphite materials, are acted on by a spring force which presses the brushes against the rotating contacting device. The contacting device here rotates, for example, at a speed of approximately 3,000 to 8,000 rpm. Both the slide contacts and the brushes experience wear during operation of the electrical machine. In order to minimize wear that is due to tribological conditions, it is known to add solid lubricants, binding agents, and/or cleansers to the graphite materials used for the brushes, in addition to the metal components already present.

In order to cool rotating electrical machines, on the one hand, systems are known in which an air current is conveyed over the components to be cooled and on the other hand, there are known embodiments in which a fluid cooling medium is conveyed past the components to the cooled. If a hermetically sealed housing is provided for noise protection reasons, or in order to protect the components of the electrical machine from external influences, then a heat flow from the inside of the housing can take place only through its walls. Such internal cooling systems have been produced up to this point only using a gas as the cooling medium. A disadvantage to this is the low thermal conductivity of the cooling medium so that only an insufficient heat dissipation can be expected. The use of a fluid cooling medium would lead to an undesirable increase in the shear stresses in the vicinity of rotating components so that an embodiment of this kind is only useful for electrical machines that operate at low speeds. Furthermore, when fluid coolants are used, there are additional tribological stresses in the vicinity of the slide contacts. Since the slide contacts are wetted or covered by the coolant, a penetration of oxygen is prevented. As a result, an oxidic protective layer, which covers the slide contacts of the contact device, wears away more quickly and the overall service life of the slide system is reduced.

ADVANTAGES OF THE INVENTION

By contrast with the prior art, in a rotating electrical machine with the features disclosed in claim 1, through the use of a special cooling medium, it is possible to keep the friction losses inside the electrical machine low and nevertheless to minimize the wear in the vicinity of the slide system. Since the electrical machine has an internal cooling system in which a fluid/gas mixture used as a cooling medium circulates around the components to be cooled, including the slide system, and since the slide contacts are comprised of an alloy with at least one alloy component that has an affinity for oxygen, an abrasion of the slide contacts of the contacting device due to tribological conditions during the sliding contact of the brushes against the slide contacts can be reduced and at the same time a very effective cooling of the components can be achieved.

The use of a fluid/gas mixture, preferably an oil, as a cooling medium causes the formation of an aerosol when the operation of the electrical machine is started. The aerosol has a greater thermal conductivity than a gas, but in terms of friction losses, has a more favorable viscosity than a cooling fluid. Depending on the application, a fluid component can make up 1 to 30% of the fluid/gas mixture. This fluid content and a selection of the fluid can be adapted to the existing requirements of the respective application. In spite of the aerosol formation, all of the surfaces of the components of the electrical machine disposed inside the housing are wetted. Since this also includes the vicinity of the slide system, in particular the slide contacts of the contacting device, the material selection indicated must prevent a premature wear.

In a preferred embodiment of the invention, the slide contacts are designed in such a way that a main component of the alloy is copper and the alloy component with the oxygen affinity is a base metal and/or a metalloid. It is clear from this that the selection of possible alloys is not limited to binary or tertiary systems, but permits any combination of the corresponding alloy components. In this connection, the alloy components with oxygen affinity are preferably added in a weight percentage of approximately 0.05 to 3%, in particular 0.3 to 0.9%.

It has turned out to be particularly advantageous to select the base metal as an element or a combination of elements from the group including magnesium, zirconium, titanium, hafnium, tungsten, molybdenum, vanadium, and iron. A particularly preferable metalloid can be an element or combination of elements selected from the group including tellurium, silicon, and boron. Moreover, it has turned out to be advantageous if the alloy contains companion elements such as oxygen and/or phosphorus in the parts per thousand or parts per million range.

Other preferred embodiments of the invention ensue from the remaining features disclosed in the dependent claims.

DRAWING

The invention will be explained in detail below in the discussion of an exemplary embodiment in conjunction with the associated drawing, which depicts a claw-pole generator.

DESCRIPTION OF THE EXEMPLARY EMBODIMENT

The sole FIGURE shows a sectional view through a claw-pole generator 10 of the type used in automotive industry. The claw-pole generator 10 has a stationary exciting winding 12 and a stator winding 16, which are accommodated inside a generator housing 18. The function and design of such claw-pole generators 10 are generally known and will therefore not be discussed in detail at this point.

First of all, a slide system 20 is integrated into the generator housing 18. The slide system 20 is comprised of a slide contact support 22, with slide contacts embodied as slide rings 24 disposed on its circumference. During operation of the electrical machine, the slide rings 24 are brought into sliding contact with a brush apparatus 26. The brush apparatus 26 is comprised of a brush holder 28 and brushes 30 oriented toward the slide rings 24. By means of the brush holder 28, a spring force is exerted on the brushes 30, for example with the aid of a spring element that is not shown here, which presses the brushes 30 against the rotating slide rings 24.

The generator housing 18, which is hermetically sealed, also has an internal cooling system 32 integrated into it. The internal cooling system 32 extends over the entire free inner space of the housing 18, i.e. the space that is not occupied by the components of the electrical machine disposed inside the housing 18. The inner chamber is filled with a fluid/gas mixture used as a cooling medium. Oils are particularly suited for use as fluid components. A fill level as well as the selection of the fluid can be made to depend on the respective application, i.e. for example, by taking into account a presumptive speed range of the electrical machine or a viscosity of the fluid. When the operation of the machine is begun, an aerosol is formed by the motion of the rotating parts inside the housing 18. The aerosol has a greater thermal conductivity than a gas and consequently permits a better heat dissipation from the interior via the walls 34 of the housing 18.

Since the slide system 20, in particular in the vicinity of the slide rings 24 and brushes 30, is also covered by the cooling medium, and therefore a penetration of oxygen is prevented, at least to the greatest degree possible, then it is necessary to correspondingly adapt the slide system 20. These particular requirements can be taken into account in that the slide rings 24 are produced on the basis of an alloy with at least one alloy component that has an oxygen affinity. A main component of the alloy is copper, while the alloy component with the oxygen affinity is a base metal and/or a metalloid.

The choice of the above-mentioned alloy components could reduce a wear on the oxide layer protecting the slide rings 24, resulting in a longer overall service life.

A selection of the alloy components with the oxygen affinity can be adapted to the respective requirements. In particular, tribologically-induced material changes, such as pseudoalloy formation, supperlattices, mixed oxide films and the like, can be advantageously used in order to further reduce the overall wear. The choice of the alloy is also not limited to binary or tertiary systems, i.e. any number of alloy components with an oxygen affinity can be added to the main component of copper. These particularly include metals such as magnesium, zirconium, titanium, hafnium, tungsten, molybdenum, vanadium, and iron, as well as metalloids such as tellurium, silicon, and boron. It has also turned out to be advantageous sometimes to add companion elements to the alloy, such as oxygen and/or phosphorus in the parts per thousand or parts per million range. A weight percentage in the alloy of the alloy components with the affinity for oxygen here should be in the range from 0.05 to 3%, in particular from 0.3 to 0.9%.

The invention is not limited to the exemplary embodiment given. Thus the contacting device can also include a commutator which has slide contacts embodied in the form of laminas.

What is claimed is:

1. A rotating electrical machine with a contacting device whose circumference has at least one slide contact disposed on it, which remains in sliding contact with a brush apparatus (slide system), in which the at least one slide contact is comprised of a wear resistant material, characterized in that the electrical machine has an internal cooling system in which a fluid/gas mixture used as a cooling medium circulates around the components to be cooled, including the slide system, and the at least one slide contact is comprised of an alloy with at least one alloy component that has an affinity for oxygen.

2. The rotating electrical machine according to claim 1, characterized in that a main component of the alloy is copper and the alloy component with the affinity for oxygen is a base metal and/or a metalloid.

3. The rotating electrical machine according to claim 2, characterized in that the base metal is an element or a combination of elements from the group including magnesium, zirconium, titanium, hafnium, tungsten, molybdenum, vanadium, and iron.

4. The rotating electrical machine according to claim 2, characterized in that the metalloid is an element or a combination of elements from the group including tellurium, silicon, and boron.

5. The rotating electrical machine according to claim 1, characterized in that a weight percentage in the alloy of the alloy components with the affinity for oxygen is in the range from 0.05 to 3%, in particular from 0.3 to 0.9%.

6. The rotating electrical machine according to claim 1, characterized in that the alloy contains companion elements such as oxygen and/or phosphorus in the parts per thousand or parts per million range.

7. The rotating electrical machine according to claim 1, characterized in that the fluid is an oil.

* * * * *